United States Patent [19]
Kim et al.

[11] Patent Number: 5,805,826
[45] Date of Patent: Sep. 8, 1998

[54] METHOD FOR TRANSMITTING COMPRESSED VIDEO DATA AND APPARATUS FOR PERFORMING THE SAME

[75] Inventors: In Kim; Yang-Hun Choi; Dong-Soo Choi; Sung-Min Her, all of Seoul, Rep. of Korea

[73] Assignee: SamSung Electronics Co., Ltd., Suwon, Rep. of Korea

[21] Appl. No.: 574,345

[22] Filed: Dec. 18, 1995

[30] Foreign Application Priority Data

Dec. 19, 1994 [KR] Rep. of Korea .................. 35074/1994

[51] Int. Cl.$^6$ ..................................................... G06F 13/42
[52] U.S. Cl. ....................... 395/200.77; 386/33; 386/109; 395/888
[58] Field of Search ........................... 364/544 R, 514 A, 364/400; 395/200.07, 200.14, 842, 843, 846, 847, 848, 852, 308, 888, 200.77

[56] References Cited

U.S. PATENT DOCUMENTS

| | | | |
|---|---|---|---|
| 5,287,471 | 2/1994 | Katayose et al. | 395/842 |
| 5,325,489 | 6/1994 | Mitsuhira et al. | 395/842 |
| 5,434,913 | 7/1995 | Tung et al. | 379/202 |
| 5,488,570 | 1/1996 | Agarwal | 364/514 R |
| 5,490,247 | 2/1996 | Tung et al. | 395/501 |
| 5,506,954 | 4/1996 | Arshi et al. | 395/501 |
| 5,508,942 | 4/1996 | Agarwal | 364/514 R |
| 5,511,003 | 4/1996 | Agrawal | 364/514 R |
| 5,515,296 | 5/1996 | Agarwal | 364/514 R |
| 5,546,518 | 8/1996 | Blossom et al. | 345/473 |
| 5,574,953 | 11/1996 | Rust et al. | 395/888 |
| 5,680,601 | 10/1997 | Rust | 707/100 |

*Primary Examiner*—Edward R. Cosimano
*Attorney, Agent, or Firm*—Robert E. Bushnell, Esq.

[57] ABSTRACT

An apparatus for transmitting compressed video data includes a data interfacing circuit, a data connecting circuit, a decompression unit, and a CPU. The data interfacing circuit receives and stores compressed video data, generates a first control signal in response to receipt of the compressed video data, identifies an address bus and a data bus used for transmitting the compressed video data and then generates a hold permission signal in response to receipt of a hold request signal. The data interfacing circuit also provides output of the compressed video data in response to receipt of an address control signal. The decompression unit generates a data request signal to request input of said compressed video data. The decompression unit receives the compressed video data from the data interfacing circuit and decompresses the compressed video data to generate a motion picture in response to receipt of a data permission signal. The data connecting circuit generates the hold request signal in response to receipt of a second control signal and the data request signal, generates the address control signal in response to receipt of said hold permission signal, and generates a transmission state signal indicating that transmission of the compressed video data to the decompression unit is complete. The CPU generates the second control signal in response to receipt of the first control signal, and generates a third control signal to clear the data connecting circuit in response to receipt of the transmission state signal.

18 Claims, 2 Drawing Sheets

METHOD FOR TRANSMITTING COMPRESSED VIDEO DATA AND APPARATUS FOR PERFORMING THE SAME

CROSS-REFERENCE TO RELATED APPLICATIONS

This application makes reference to, incorporates the same herein, and claims all benefits accruing under 35 U.S.C. §119 from an application for Method For Transmitting Compressed Video Data And Apparatus For Performing The Same earlier filed in the Korean Industrial Property Office on 19 Dec., 1994 and there assigned Ser. No. 35074/1994.

BACKGROUND OF THE INVENTION

The present invention relates to a transmission apparatus and method for transmitting video data that has been compressed according to a designated compression technique, such as the Motion Picture Expert Group (MPEG) standard.

The asynchronous transfer mode (ATM) is currently the best transfer mode available for embodying a broad-band integrated services digital network (B-ISDN) used to transmit compressed video data. With the asynchronous transfer mode (ATM), all signals, whether they be voice, image or data, are transmitted by a packet, referred to as a cell, which has a fixed length of 53 bytes. The transmission may be performed according to a variable bit-rate, with a burst characteristic like a video signal and communication data, or a constant bit-rate, which has a continual characteristic like a large information file. Voice and image signals are much more sensitive to time delay than to loss, whereas a data signal does not require real-time transmission, but is very sensitive to loss.

The compression of video data has been standardized by the Motion Picture Experts Group (MPEGs). The well-known MPEG protocol is one commonly used to compress video data by using an intraframe compression scheme that compresses information within a single frame, and an interframe compression scheme based on motion prediction techniques that eliminate redundant data between frames. Under the MPEG standards, compression is performed based on the assumption that most pixels do not change much in successive frames in a time series of images. MPEG decompression hardware, such as the ReelMagic card produced by Sigma Designs, is able to decode data compressed according to the MPEG standard to recreate smoothly flowing motion picture data for video display with only minor artifacts caused by data lost through compression. In a system that receives and decompresses video data compressed according to a designated compression standard, such as MPEG, compressed video data is typically transmitted to a decompression unit via a well-known ISA (Industry Standard Architecture) bus. This, however, often places a heavy operating burden on the ISA bus since many devices commonly seek access to the ISA bus. As a result, system functions can deteriorate since the use of other devices connected to the ISA bus is not available during the transmission process.

SUMMARY OF THE INVENTION

Accordingly, it is an object of the present invention to provide an improved method and apparatus for transmitting compressed video data to a decompression unit.

It is another object to provide a method and apparatus for efficiently transmitting video data that has been compressed according to a given standard, such as an MPEG standard, to a decompression unit.

It is still another object to provide a method and apparatus for transmitting compressed video data to a decompression unit without utilizing an ISA bus.

It is yet another object to provide a method and apparatus for transmitting compressed video data to a decompression unit that efficiently utilizes memory resources.

These and other objects can be achieved with an apparatus for transmitting compressed video data including a data interfacing circuit, a data connecting circuit, a decompression unit, and a CPU. The data interfacing circuit receives and stores compressed video data, generates a first control signal in response to receipt of the compressed video data, identifies an address bus and a data bus used for transmitting the compressed video data and then generates a hold permission signal in response to receipt of a hold request signal. The data interfacing circuit also provides output of the compressed video data in response to receipt of an address control signal. The decompression unit generates a data request signal to request input of the compressed video data. The decompression unit receives the compressed video data from the data interfacing means via the data bus and decompresses the compressed video data to generate a motion picture in response to receipt of a data permission signal. The data connecting circuit generates the hold request signal in response to receipt of a second control signal and the data request signal, generates the address control signal to control transmission of the compressed video data to the decompression unit in response to receipt of said hold permission signal, and generates a transmission state signal indicating that transmission of the compressed video data to the decompression unit is complete. The data connecting circuit is cleared in response to receipt of a third control signal. The CPU generates the second control signal in response to receipt of the first control signal, and generates the third control signal in response to receipt of the transmission state signal.

The method for transmitting the compressed video data using the apparatus described above includes the steps of: determining whether the compressed video data is received by the apparatus; determining whether transmission of the compressed video data is being requested by the decompression unit after the compressed video data is received by the apparatus; identifying an address bus and a data bus used to transmit the compressed video data within the apparatus after determining that the transmission of the compressed video data is being requested; transmitting the compressed video data to the decompression unit for decompression and generation of a moving picture; and recognizing completion of the transmission of the compressed video data.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
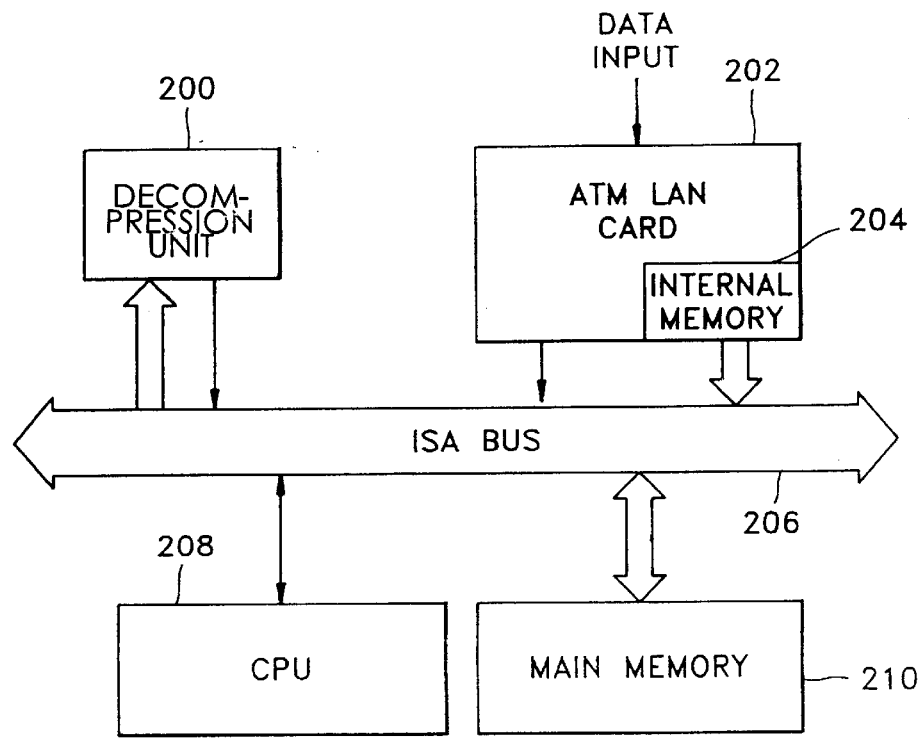
FIG. 1 is a block diagram illustrating a conventional apparatus for transmitting compressed video data.

Turning now to the drawings and referring to FIG. 1, the operation of a conventional apparatus for transmitting compressed video data will now be described in detail. The apparatus of FIG. 1 is composed of a decompression unit 200, an ATM LAN (asynchronous transfer mode local area network) card 202 which includes an internal (RAM) memory 204, an ISA (industry standard architecture) bus 206, a CPU (central processing unit) 208, and a main memory 210. In FIG. 1, compressed video data being communicated through a communication network is input to ATM LAN card 202 and stored in internal memory 204. When a prescribed block of the data is transmitted or received, ATM LAN card 202 uses an interrupt to report the completion of communication of compressed data to CPU 208 via ISA bus 206. Then, using an interrupt processing program, CPU 208 enables transfer of the compressed video data stored in internal memory 204 of ATM LAN card 202 to a temporary memory area of main memory 210 via ISA bus 206, or vice versa. Decompression unit 200 outputs a DMA (direct memory access) request signal to CPU 208 via ISA bus 206 in order to receive input of the compressed video data and provide output of decompressed video data. The principles of the present invention can be applied to video data that has been compressed according to any known technique, such as a technique conforming to an existing MPEG standard, as well as any other compression techniques that may be developed in the future.

When controlling data transmission between peripheral devices, such as a memory or an I/O (input/output) device, CPU 208 repeats the operation of reading out data from one peripheral device and writing the read data to another peripheral device. However, when CPU 208 controls the transmission of a large amount of data, time loss occurs in that CPU 208 cannot control any other operation during that transmission time. Accordingly, a DMA control unit, which reads data from a peripheral device and simultaneously writes the data to another peripheral device may be used instead of CPU 208. This reduces the operational burden placed on CPU 208, and allows CPU 208 to perform other internal operations during that time.

In FIG. 1, when CPU 208 receives the DMA request signal, the compressed data stored in the temporary memory area of main memory portion 210 is transferred to decompression unit 200 so as to be restored (i.e., decompressed) into a motion picture.

As described above in conjunction with FIG. 1, the compressed data input to ATM LAN card 202 is transmitted to main memory 210 via ISA bus 206, and the compressed data stored in main memory 210 is transmitted to decompression unit 200 via ISA bus 206 in accordance with the DMA request signals from decompression unit 200. In this transmission process, it is necessary that data be frequently transmitted over ISA bus 206. Accordingly, a heavy operating burden is imposed on s ISA bus 206 due to the process of inputting and outputting data to and from decompression unit 200 via ISA bus 206. As a result, system functions can deteriorate since the use of other devices connected to ISA bus 206 is not available during the transmission process described above. Moreover, the configuration of FIG. 1 wastefully allocates memory capacity to main memory 210 for temporary data storage.

Figure 2:
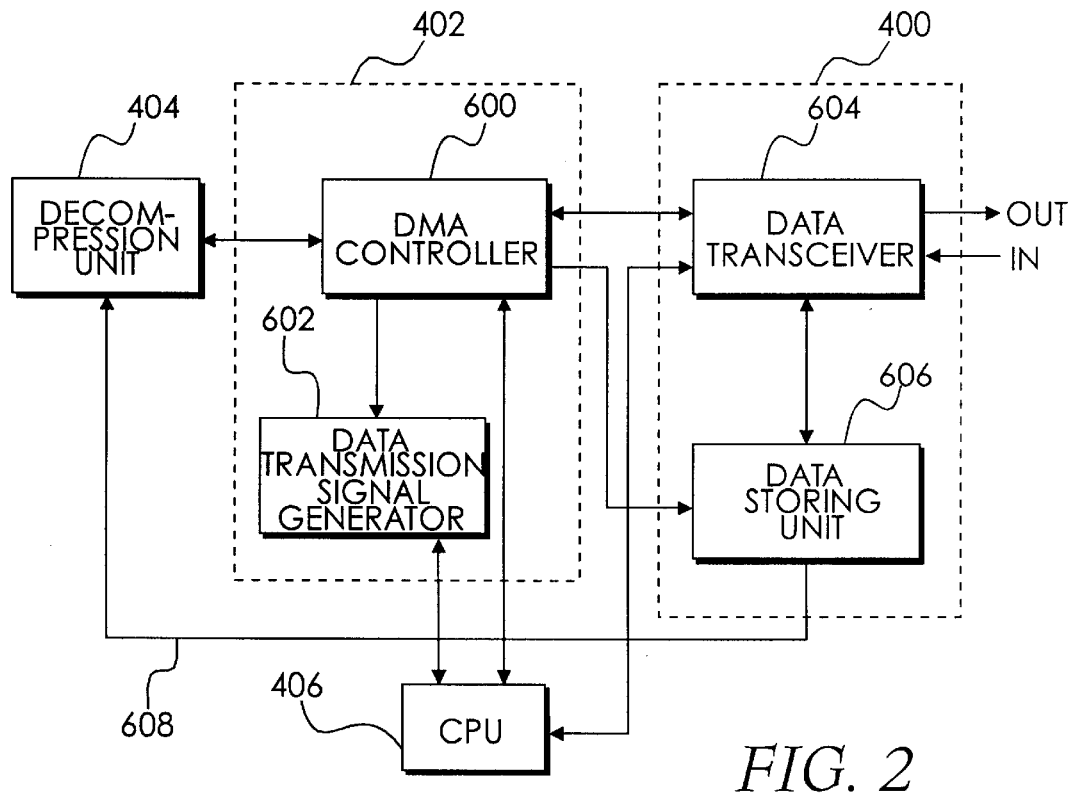
FIG. 2 is a block diagram illustrating the apparatus for transmitting compressed video data according to the principles of the present invention.

Referring now to FIG. 2, a block diagram of the apparatus for transmitting compressed video data according to the principles of the present invention is shown. The apparatus represented in FIG. 2 includes a data interfacing circuit 400 constituted by a data transceiver 604 and a data storing unit 606. A data connecting circuit 402 is constituted by a DMA controller 600 and a data transmission signal generator 602. FIG. 2 further includes a decompression unit 404, and a CPU 406.

Figure 3:
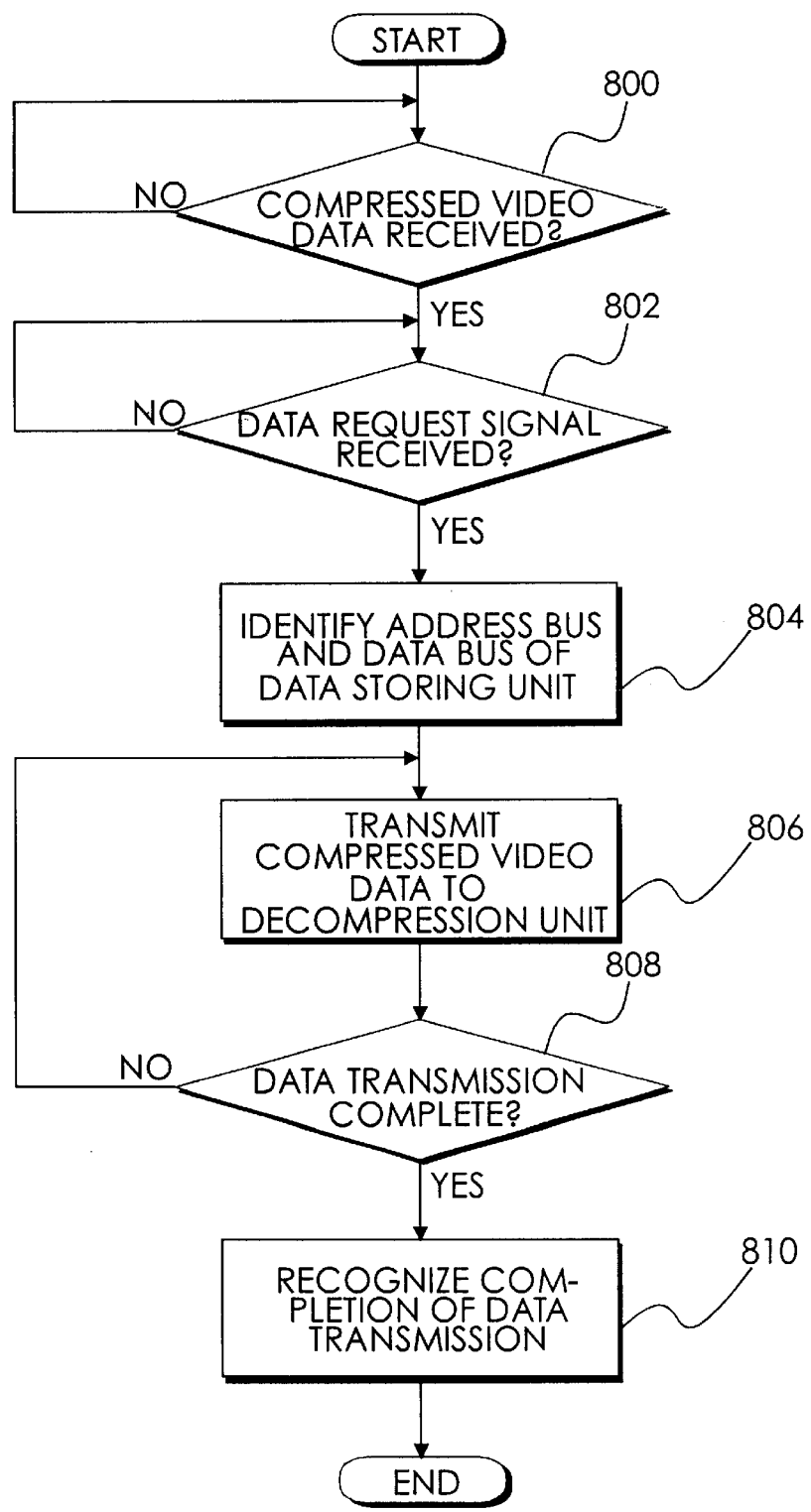
FIG. 3 is a flowchart explaining the transmission method of the present invention that is performed by the apparatus shown in FIG. 2.

Referring to FIGS. 2 and 3, a method and apparatus for transmitting compressed video data according to the principles of the present invention will now be described in detail.

In a network communication system, data transceiver 604 transmits and receives blocks of compressed video data through the OUT and IN ports shown in FIG. 2, respectively. When a data block is transmitted to or received from an external source, data transceiver 604 generates a first control signal for output to CPU 406 to indicate that data communication has occurred. In step 800, CPU 406 continuously checks for receipt of the first control signal to determine whether compressed video data has been received by data transceiver 604. After receiving the first control signal, CPU 406 outputs a second control signal to DMA controller 600 to permit operation of DMA controller 600. In step 802, DMA controller 600 determines whether a data request signal is received from decompression unit 404 to request input of compressed video data. If at step 802 DMA controller 600 determines that a data request signal has not been received, then step 802 is repeated. After receiving the data request signal and the second control signal, DMA controller 600 generates a hold request signal for transmission to data transceiver 604 in order to obtain permission to perform a DMA operation. In step 804, data transceiver 604 identifies a separate data bus and address bus of data storing unit 606 used in transmitting compressed video data in response to the hold request signal. Data transceiver 604 then generates a hold permission signal and transmits the hold permission signal to DMA controller 600. DMA controller 600 designates an address of data to be transmitted using the address bus of data storing unit 606, and enables loading of the data to be transmitted on a data bus 608 that is internal to the apparatus by providing an address control signal to data storing unit 606 in order to control the data transmission. DMA controller 600 then generates a data permission signal for output to decompression unit 404 to permit performance of the DMA operation in response to the data request signal. Accordingly, compressed video data is transmitted from data storing unit 606 to decompression unit 404 via data bus 608 in step 806. In step 808, DMA controller 600 determines whether the data transmission is complete. If the data transmission is not complete, DMA controller 600 continues to enable transmission of the data in step 806 until completion. When the data transmission is complete, DMA controller 600 outputs an interrupt signal to data transmission signal generator 602 to indicate that transmission of one data block is complete. Data transmission signal generator 602 receives the interrupt signal and responds by generating a transmission state signal for output to CPU 406. In step 810, CPU 406 receives the transmission state signal and recognizes that transmission of one data block is complete. CPU 406 then generates a third control signal for output to data transmission signal generator 602. The third control signal clears data transmission signal generator 602 so that the next transmission state signal indicating the completion of transmission of a next data block can be generated by data transmission signal generator 602.

As described above, the method and apparatus for transmitting compressed video data according to the principles of the present invention transmits the compressed data directly to decompression unit 404 without utilizing an ISA bus by interposing data connecting circuit 402 between data interfacing circuit 400 and decompression unit 404. Accordingly, the operating burden placed upon the ISA bus can be minimized, and use of a temporary memory area within a main memory is not required.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. For example, the MPEG compression standard has been specifically disclosed as an exemplary compression technique for compressing video data used in the practice of the present invention. It is, however, contemplated that video data compressed according to other techniques can also be used to carry out the present invention. Therefore, it is intended that the present invention not be limited to the particular embodiments disclosed as the best mode contemplated for carrying out the present invention, but that the present invention includes all embodiments falling within the scope of the appended claims.

What is claimed is:

1. An apparatus for transmitting compressed video data to a data decompression unit of a video system comprising a central processing unit, said data decompression unit for video data decompression, and a main system bus for video data communication, said apparatus comprising:

a data interface unit coupled to receive said compressed video data from an external source for generating a first control signal in response to receipt of said compressed video data, identifying a data bus different from said main system bus used for transmitting said compressed video data to said data decompression unit and then generating a hold permission signal in response to receipt of a hold request signal, and providing output of said compressed video data in response to receipt of an address control signal;

said data decompression unit for generating a data request signal to request input of said compressed video data from said data interface unit via said data bus, and for decompressing said compressed video data to generate a motion picture in response to receipt of a data permission signal;

a data connection unit disposed between said data interface unit and said data decompression unit, for generating said hold request signal in response to receipt of a second control signal and said data request signal, generating said address control signal to control transmission of said compressed video data to said d decompression unit for video data decompression in response to receipt of said hold permission signal, and generating a transmission state signal indicating that transmission of said compressed video data to said data decompression unit is complete, said data connection unit being cleared in response to receipt of a third control signal; and said central processing unit for generating said second control signal in response to receipt of said first control signal, and generating said third control signal in response to receipt of said transmission state signal.

2. The apparatus of claim 1, wherein said data interface comprises:

a data transceiver for transmitting and receiving said compressed video data, generating said first control signal in response to receipt of said compressed video data and generating said hold permission signal in response to receipt of said compressed video data and generating said hold permission signal in response to receipt of said hold request signal; and a data memory for storing said compressed video data and providing output of said compressed video data to said data decompression unit in response to receipt of said address control signal.

3. The apparatus of claim 2, further comprised of said data interface receiving said compressed video data in a format of intraframe compression applied to video information representing single frames of video data and interframe compression through prediction of occurrence of motion between successive frames of said video data minimizing redundant data occurring between said successive frames of said video data.

4. The apparatus of claim 1, wherein said data connection unit comprises:

a direct memory access controller for receiving said data request signal, said second control signal and said hold permission signal, and for generating said hold request signal, said address control signal and said data permission signal; and a data transmission generator for generating said transmission state signal when said data decompression unit to enable the transmission of said compressed video data from said data interface unit to said data decompression unit via said data bus.

5. The apparatus of claim 4, wherein said compressed video data corresponds to video data compressed in accordance with a Moving Picture Experts Group (NTEG) standard.

6. A method for transmitting compressed video data within a video system that receives said compressed video data and decompresses said compressed video data to generate a moving picture, said method comprising the steps of:

determining whether said compressed video data is received by said video system;

determining whether transmission of said compressed video data is being requested after said compressed video data is received by said video system;

identifying an address bus and a data bus used to transmit said compressed video data within said video system after determining that the transmission of said compressed video data is being requested, with said data bus being separate from a main system bus of said video system;

transmitting said compressed video data, via said data bus, to a decompression unit within said video system for decompressing said compressed video data to generate said moving picture; and recognizing completion of the transmission of said compressed video data.

7. The method of claim 6, wherein said compressed video data corresponds to video data compressed in accordance with a Moving Picture Experts Group (MPEG) standard.

8. A method for transmitting compressed data within a video system comprising a main system bus, a central processing unit, a data decompression unit, and a transmission apparatus having a data interface unit, a data connection unit, and a data bus different from said main system bus for transferring said compressed data from said data interface unit to said data decompression unit for data decompression, said method comprising the steps of:

generating, from said data interface unit, a first control signal in response to receipt of said compressed data from an external source;

generating, from said central processing unit, a second control signal in response to receipt of said first control signal from said data interface unit;

generating, from said data decompression unit, a data request signal to request input of said compressed data from said data interface unit for data decompression;

detecting, at said data connection unit, said data request signal indicating that said data decompression unit requests transmission of said compressed data, and generating, in response to said second control signal and said data request signal, a hold request signal indicating that said data connection unit requests permission to perform a direct memory access operation;

identifying, at said data interface unit, an address bus and a data bus different from said main system bus of said video system used to transmit said compressed data within said video system in response to said hold request signal, and generating, from said data interface unit, a hold permission signal and transmitting said hold permission signal to said data connection unit;

generating, from said data connection unit, an address control signal in response to receipt of said hold permission signal and transmitting said address control signal to said data interface unit to control transmission of said compressed data from said data interface unit to said data decompression unit; and generating, from said data connecting unit, a data permission signal and transmitting said data permission signal to said data decompression unit to enable the transmission of said compressed data from said data interface unit to said data decompression unit via said data bus.

9. The method of claim 8, further comprised of said data interface unit receiving said compressed data from said external source in a format of intraframe compression applied to video information representing single frames of video data and interframe compression through prediction of occurrence of motion between successive frames of said video data minimizing redundant data occurring between said successive frames of said video data.

10. The method of claim 8, further comprising a step of decompressing, at said data decompression unite, said compressed data to generate aid moving picture after the transmission of said compressed data from said data interface unit to said data decompression unit.

11. The method of claim 10, wherein said compressed data corresponds to data compressed in accordance with a Moving Picture Experts Group standard.

12. The method of claim 8, further comprising a step of generating, at said central processing unit, a third control signal to clear said data connection unit after the transmission of said compressed data from said data interface it to said data decompression unit.

13. The method of claim 12, wherein said compressed data corresponds to data compressed in accordance with a Moving Picture Experts Group standard.

14. An apparatus for transmitting compressed data in a video system comprising a central processing unit, a data decompression unit for data decompression to generate a moving picture, and a main system bus for generally transporting video data, said apparatus comprising:

a data interface unit for storing said compressed data received from an external source and generating a first control signal in response to receipt of said compressed data;

a data connection unit disposed between said data interface unit and said data decompression unit, for detecting receipt of a data request signal provided from said data decompression unit indicating that said data decompression unit requests input of said compressed data, said data connection unit generating a hold request signal and transmitting said hold request signal to said data interface unit in response to receipt of said data request signal;

said data interface unit identifying an address bus and a data bus different from said main system bus used to transmit said compressed data to said data decompression unit, generating a hold permission signal and transmitting said hold permission signal to said data connection unit in response to receipt of said hold request signal; and said data connection unit, in response to receipt of said hold permission signal, generating an address control signal and providing said address control signal to said data interface unit to control transmission of said compressed data from said data interface unit to said data decompression unit, said data connection unit then generating a data permission signal and transmitting said data permission signal to said data decompression unit to enable the transmission of said compressed data from said data interface unit to said data decompression unit.

15. The apparatus of claim 14, wherein said compressed data corresponds to video data compressed in accordance with a Moving Picture Experts Group standard.

16. The apparatus of claim 14, wherein said data interface comprises:

a data transceiver for receiving said compressed data from said external source, generating said first control signal in response to receipt of said compression data and generating said hold permission signal in response to receipt of said hold request signal; and a data memory for storing said compressed data and providing output of said compressed data to said data decompression unit in response to receipt of said address control signal.

17. The apparatus of claim 16, further comprised of said central processing unit generating a third control signal and transmitting said third control signal to said data connection unit to clear said data connection unit, after said compressed data has been transmitted from said data memory of said data interface unit to said data decompression unit.

18. The apparatus of claim 17, wherein said compressed data corresponds to video data compressed in accordance with a Moving Picture Experts Group standard.

* * * * *